(12) United States Patent
Krueger et al.

(10) Patent No.: US 10,001,429 B2
(45) Date of Patent: Jun. 19, 2018

(54) METHOD AND DEVICE FOR CHECKING THE WHEEL SUSPENSION OF A VEHICLE

(71) Applicant: Robert Bosch GmbH, Stuttgart (DE)

(72) Inventors: Christof Krueger, Karlsfeld (DE); Pavel Pavlov, Munich (DE); Simone Graf, Munich (DE); Stefanie Peters, Darmstadt (DE); Tobias Hanning, Munich (DE)

(73) Assignee: Robert Bosch GmbH, Stuttgart (DE)

( * ) Notice: Subject to any disclaimer, the term of this patent is extended or adjusted under 35 U.S.C. 154(b) by 118 days.

(21) Appl. No.: 15/125,011

(22) PCT Filed: Mar. 10, 2015

(86) PCT No.: PCT/EP2015/054890
§ 371 (c)(1),
(2) Date: Sep. 9, 2016

(87) PCT Pub. No.: WO2015/135898
PCT Pub. Date: Sep. 17, 2015

(65) Prior Publication Data
US 2017/0023444 A1    Jan. 26, 2017

(30) Foreign Application Priority Data

Mar. 14, 2014 (DE) .................. 10 2014 204 809

(51) Int. Cl.
*G01M 17/04* (2006.01)
*G01M 17/06* (2006.01)
*G01B 11/275* (2006.01)

(52) U.S. Cl.
CPC ......... *G01M 17/04* (2013.01); *G01B 11/2755* (2013.01); *G01M 17/06* (2013.01); *G01B 2210/14* (2013.01); *G01B 2210/20* (2013.01)

(58) Field of Classification Search
CPC ............ G01B 11/2755; G01B 2210/20; G01B 2210/14; G01B 3/12; G01M 17/04; G01M 17/007; G01M 17/06; G06T 2207/30252
See application file for complete search history.

(56) References Cited

U.S. PATENT DOCUMENTS 6,748,796 B1 * 6/2004 Van Den Bossche ............. G01B 11/2755 33/288
8,150,144 B2 * 4/2012 Nobis ................ G01B 11/2755 382/154

(Continued)

FOREIGN PATENT DOCUMENTS

CN    101553706 A    10/2009
DE    2948573 A1    6/1981

(Continued)

OTHER PUBLICATIONS

International Search Report dated Jul. 9, 2015, of the corresponding International Application PCT/EP/2015/054890, filed Mar. 10, 2015.

*Primary Examiner* — Freddie Kirkland, III
(74) *Attorney, Agent, or Firm* — Norton Rose Fulbright US LLP; Gerard Messina

(57) ABSTRACT

A device for checking the wheel suspension of a vehicle, in particular, of a motor vehicle, includes: a device for determining the wheel normals and/or the center of rotation of a wheel of the vehicle; a device for determining the movement trajectory of the wheel normals and/or of the center of rotation of the wheel during a movement of the vehicle; and a comparison and evaluation device, which is configured to compare the determined movement trajectory of the wheel normals and/or of the center of rotation of the wheel to a predefined movement trajectory, and to output a defect (Continued)

message when the deviation of the determined movement trajectory from the predefined movement trajectory exceeds a predefined limiting value.

12 Claims, 2 Drawing Sheets

(56) References Cited

U.S. PATENT DOCUMENTS

| | | | | |
|---|---|---|---|---|
| 8,724,123 | B2* | 5/2014 | Seifert | G01B 5/008 356/635 |
| 8,836,764 | B2* | 9/2014 | Gruetzmann | G01B 11/275 348/46 |
| 8,948,444 | B2* | 2/2015 | Nobis | G01B 11/275 382/100 |
| 9,599,538 | B2* | 3/2017 | Graf | G01B 11/16 |
| 9,779,560 | B1* | 10/2017 | Dorrance | G07C 5/0808 |

FOREIGN PATENT DOCUMENTS

| | | |
|---|---|---|
| DE | 102006035924 A1 | 2/2008 |
| DE | 102008042145 A1 | 3/2010 |
| DE | 102012215754 A1 | 3/2014 |
| WO | 0138843 A1 | 5/2001 |

* cited by examiner

METHOD AND DEVICE FOR CHECKING THE WHEEL SUSPENSION OF A VEHICLE

FIELD

The present invention relates to a method and a device for checking the wheel suspension of a vehicle, in particular, of a motor vehicle.

BACKGROUND INFORMATION

The wheel suspension is the connecting link between a wheel and the chassis of a vehicle. The connection is formed by axles or comparable structures, the steering management is implemented by so called guide rods. Generally, these are struts, which are attached to the chassis and fix the wheel suspension in position. One distinguishes between transverse control arms, semi-trailing arms and trailing arms. Today, transverse control arms, which are positioned approximately in the direction of travel, are mostly used in modern passenger cars, in order to fix the wheel in position horizontally and to allow vertical movement. While driving in the direction of travel (straight ahead), the wheel should rotate about a fixed axis of rotation, which is mainly determined by the transverse control arm and the wheel bearing.

Wheel bearings and transverse control arms are parts subject to wear, which may wear out or may also be damaged. Generally, damage to or wear of a wheel bearing or transverse control arm may be recognized visually from the outside, since they are attached to the inner side of the wheel rim. In curves, in particular, which are driven through rapidly, defective or worn wheel bearings generate a background noise, which is a function of the speed. Worn transverse control arms result in uneven straight-ahead travel, which is also referred to as floating of the vehicle. Due to the reduced stability of the wheels caused by the untrue motion of the wheels, the rolling resistance also increases, thereby increasing the fuel consumption.

Apart from the regular replacement of the part subject to wear, that is, the wheel bearing, defective wheel suspensions, whether faulty wheel bearings or transverse control arms, have been detected visually up to this point. In addition to this, an experienced mechanic may detect a defect due to shaking of the lifted-off wheel. Outside of the inspection intervals, this occurs mostly when, due to the handling at higher speeds, a corresponding indication is present. However, inexperienced drivers may fail to notice such an indication, which, during an inspection, would result in the diagnosis of a defect of the wheel suspension.

SUMMARY

An object of the present invention is to provide a method and a device for rapidly and reliably checking the wheel suspension of a vehicle, in particular, the wheel bearings and transverse control arms.

According to the present invention, defective or unstable wheel suspensions are detected by evaluating and monitoring the axis of rotation while slowly driving straight ahead. If the wheel suspension is defective, for instance, due to a defective transverse control arm or a defective wheel bearing, then no definite axis of rotation of the wheel may be determined, or the axis of rotation of the wheel executes indefinite movements.

Therefore, according to the present invention, deviations during the determination of the axis of rotation of the wheel are used as an indicator of a defective wheel suspension.

An example method of the present invention for monitoring the wheel suspension of a vehicle, in particular, of a motor vehicle, includes the following steps:

(A) determining the wheel normals and/or the center of rotation of at least one wheel of the vehicle;

(B) moving the vehicle and determining, in particular, optically, points of the movement trajectory of the wheel normals and/or of the center of rotation during the movement of the vehicle;

(C) determining the deviation of the movement trajectory of the wheel normals and/or of the center of rotation determined in step (B) from a predefined movement trajectory; and (D) outputting a defect message, when the deviation exceeds a predefined limiting value.

A device of the present invention for checking the wheel suspension of a vehicle, in particular, of a motor vehicle, includes:

(a) a device for determining the wheel normals and/or the center of rotation of a wheel of the vehicle;

(b) a device for measuring, in particular, optically, the movement trajectory of the wheel normals and/or of the center of rotation of the wheel during a movement of the vehicle; and (c) a comparison and evaluation device, which is configured to compare the determined movement trajectory of the wheel normals and/or of the center of rotation of the wheel to a predefined movement trajectory, and to output an error message when the deviation of the determined movement trajectory from the predefined movement trajectory exceeds a predefined limiting value.

The axis of rotation or the center of rotation of a wheel may be derived from the monitoring of the rolling wheel. In so doing, it is assumed that the rolling action of the wheel may be modeled sufficiently accurately by the rolling curves of a circle (cycloid).

During the rolling event, one or more points of the wheel and/or of a measuring target connected to the wheel are monitored. If p(T) is the position of a point at time T, then p(t) is the curve of a cycloid, from which the center of rotation of the rolling wheel may be determined. The axis of rotation of the wheel may then be ascertained from it.

Alternatively, or in addition, the axis of rotation of the wheel may be determined by a conventional static axis-measuring method, in which the track and the camber of the wheel are ascertained.

If each observation of the wheel is assigned a normal perpendicular to the respective plane of the wheel ("wheel normal"), then in the ideal case, these wheel normals form a cone, or after projection onto a plane that is oriented parallelly to the plane of the wheel, they form a circle.

After this circle has been determined, a defective wheel suspension may be detected when the degree of the deviation of the points of the cycloid p(t) from this circle exceeds a predefined value. In the method of ascertaining the axis of rotation, using the wheel normal, a defective wheel suspension may be detected from a deviation of the movement of the wheel normals from the idea conical shape, which is significantly greater than the background noise of the individual measurement.

In order to determine the degree of deviation, the method may include determining the sum of the distances of the points p(t) of the cycloid from the circle and outputting a defect message, when the sum and/or the number of points exceeds a predefined limiting value.

Alternatively, or in addition, the number of points $p(T_i)$ that are more than a predefined distance from the circle may be determined, and a defect message may be outputted, when the sum and/or the number of points $p(T_i)$ exceeds a predefined limiting value.

The method may also include, using conventional mathematical methods, determining a fitting curve, which runs through all points of the cycloid p(t), ascertaining the curvature of the fitting curve and comparing it to the curvature of the circle, in order to output a defect message when the difference between the curvature of the fitting curve and the curvature of the circle exceeds a predefined limiting value.

Using one or a combination of these methods, the degree of the deviation may be determined reliably.

In addition, the type of defect of the wheel suspension may be determined from the type and/or the degree of deviation, and recommendations for further diagnostic and/or repair steps may be made.

Since, generally, the axis of rotation of the wheels is determined within the scope of an axial measurement, the additional functionality of the present invention of detecting defective or unstable wheel suspensions may be implemented without additional expenditure. In most cases, the software of existing systems merely has to be adapted for axial measurement. In particular, a rapid assumption program, in which through a quick check, customers are made aware of possible repair tasks for their vehicle, may easily be expanded to include the detection of possible wheel suspension damage on the basis of a non-contact axial measuring system.

To perform the method, the vehicle may be moved past the device, either pushed manually or with the aid of a suitable pushing device, or driven motively under its own power. In so doing, it is important that the axis of rotation of the wheel be determined with the wheels of the vehicle loaded. Determining the axis of rotation of the wheel with the wheels unloaded, that is, in the elevated state of the vehicle, may produce erroneous results due to a lack of pressure on the wheel suspension.

In one specific embodiment, the method includes mounting at least one measuring target to at least one wheel of the vehicle and optically monitoring the measuring target, in order to determine the center of rotation and movement trajectory p(t) of the center of rotation. Defined measuring targets, which may include, in particular, reflecting measuring marks, may be optically detected especially effectively and therefore allow the method to be implemented particularly effectively and with high reliability.

An exemplary embodiment of the present invention is explained below with the aid of the figures.

DETAILED DESCRIPTION OF EXAMPLE EMBODIMENTS

Figure 1:
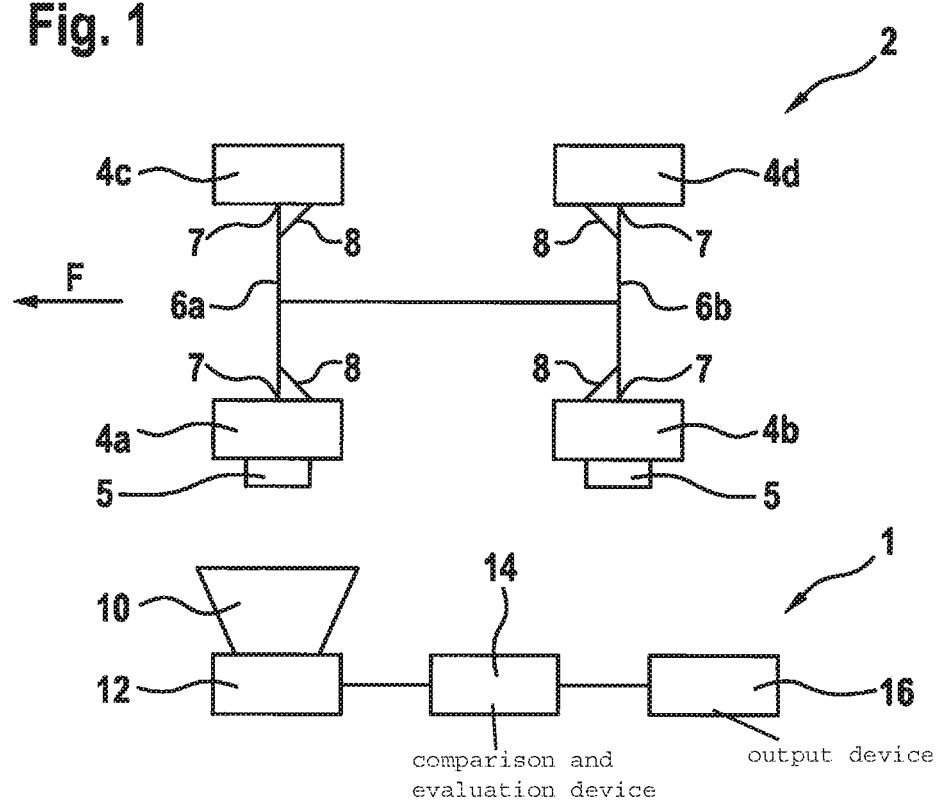
FIG. 1 shows a schematic view of an exemplary embodiment of a device of the present invention for checking the wheel suspension of a vehicle.

FIG. 1 shows a schematic view of an exemplary embodiment of a device 1 of the present invention for checking the wheel suspension of a vehicle 2.

Vehicle 2 includes four wheels 4a, 4b, 4c, 4d, in each instance, two at a front axle 6a and at a rear axle 6b of vehicle 2; each of the wheels 4a, 4b, 4c, 4d being attached to its respective axle 6a, 6b by a link 7 and a transverse control arm 8.

On the outside of vehicle 2, a measuring target 5 is mounted to each wheel 4a, 4b on the left side of vehicle 2, in direction of travel F, in such a manner, that it moves together with respective wheel 4a, 4b and, in particular, rotates together with wheel 4a, 4b.

A device 1 of the present invention includes an image recording device 10, which is configured to record images of a vehicle 2 that is moved past image recording device 10, in particular, images of wheels 4a, 4b of vehicle 2, that is, images of measuring targets 5 mounted to wheels 4a, 4b, and is configured to supply them to an image analyzing device 12. Image analyzing device 12 is configured to determine, from the images recorded by image recording device 10, the center of rotation Z of the wheel 4a, 4b of vehicle 2 rolling past image recording device 10, as well as the movement trajectory p(t) of center of rotation Z.

Device 1 of the present invention also includes a comparison and evaluation device 14, which is configured to compare the movement trajectory p(t) of center of rotation Z of a wheel 4a, 4b acquired by image recording device 12, to a predefined movement trajectory K, which may be a function of, in particular, the type of vehicle 2 and/or of wheel 4a, 4b, and, in this context, to quantitatively determine, in particular, a deviation between the movement trajectory p(t) actually recorded at vehicle 2 and predefined movement trajectory K, in order to control an output device 16, which is also part of a device 1 of the present invention, in such a manner, that it outputs a defect message, which may be, e.g., an optical and/or an acoustic defect message, if the deviation of acquired movement trajectory p(t) determined in this manner from predefined movement trajectory K exceeds a predefined limiting value.

Vehicle 2 may be pushed past image recording device 10 manually by at least one person, or driven past image recording device 10 by its own (engine) power. Also, a pushing apparatus not shown in FIG. 1 may be provided, which is configured to move vehicle 2 past image recording device 10. In this context, care must be taken that wheels 4a, 4b, 4c, 4d of vehicle 2 are loaded and roll on the ground or on guide tracks placed on the ground, which are not shown in FIG. 1.

Figure 2:
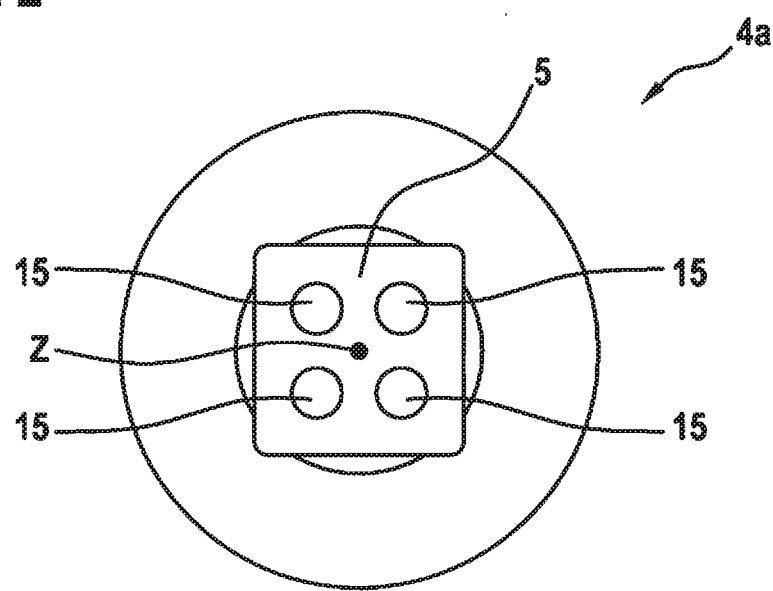
FIG. 2 shows a schematic view of a wheel equipped with a measuring target.

FIG. 2 schematically shows the view of a wheel 4a of motor vehicle 2, as it is monitored by image recording device 10.

A measuring target 5 in the form of a measuring board is attached to the rim of wheel 4a in such a manner, that it rotates together with wheel 4a about a center of rotation Z.

Several measuring marks 15 are provided, which take the form of, in particular, reflecting measuring marks 15 (retroreflective markers) that allow image recording device 10 to measure the rolling movement of wheel 4a in an optimum manner.

Figure 3:
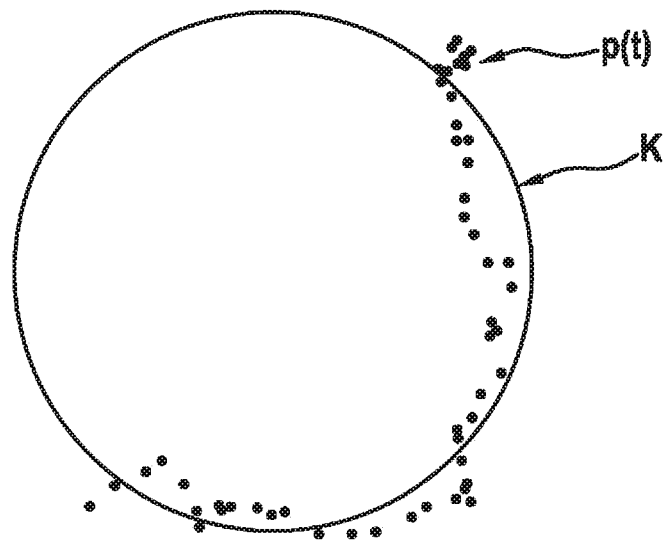
FIG. 3 shows a projection of the movement locus of the wheel normals with respect to an ideal circle, in the case of an intact wheel suspension.

FIG. 3 shows the projection of points of movement trajectory p(t) of the wheel normals and the optimum circular path K ideally expected for the case of an intact wheel suspension 7, 8.

Figure 4:
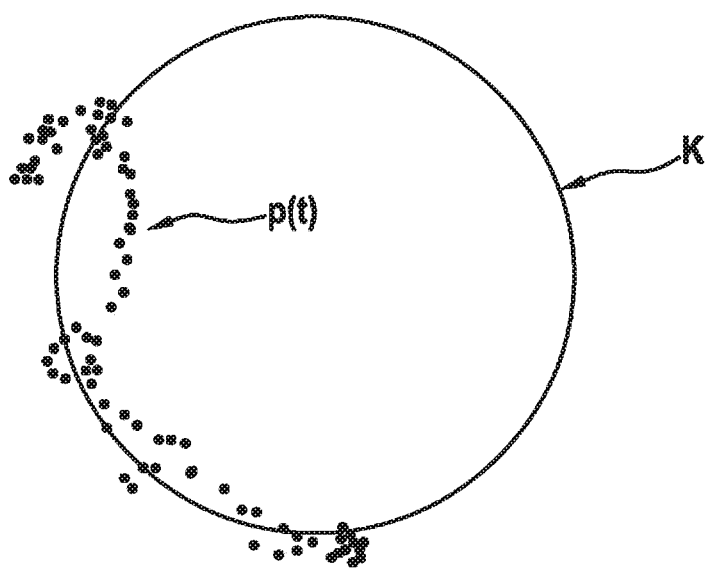
FIG. 4 shows a projection of the movement locus of the wheel normals with respect to an ideal circle, in the case of a defective wheel suspension.

FIG. 4 shows the projection of points of movement trajectory p(t) of the wheel normals with respect to the circular path K ideally expected for the case of a defective transverse control arm 7.

In FIGS. 3 and 4, it is readily apparent that the points of movement trajectory p(t) of the wheel normals in the case of a defective transverse control arm 7 (FIG. 4) have, on average, a markedly greater deviation from ideal circular path K than in the case of an intact transverse control arm (FIG. 3).

By quantitatively determining the average deviation of the points of movement trajectory p(t) from predefined, ideal circular path K, a measure of the deviation may be determined, which may be compared to a limiting value predefined for the specific type of vehicle, in order to detect damage to the wheel suspension.

In order to be able to determine the deviation quantitatively, the method may include determining the sum of the distances of the points of movement trajectory p(t) from (ideal) circular path K and outputting a defect message, if the sum of the deviations of all points exceeds a predefined limiting value.

Alternatively, or in addition, the number of points p(t), which are more than a predefined distance from circle K, may be determined, in order to output a defect message when the number of these points exceeds a predefined limiting value.

The method may also include determining a fitting curve, which runs through all points of the cycloid, ascertaining the curvature of the fitting curve and comparing it to the curvature of circle K, in order to output a defect message when the difference between the curvature of the fitting curve and the curvature of circle K exceeds a predefined limiting value.

In one expanded specific embodiment, the type of defect of wheel suspension 7, 8 may be inferred from the quantity and/or the quality of the deviation, and appropriate information and recommendations for further diagnostic and/or repair steps may be presented to the user.

What is claimed is:

1. A method for checking the wheel suspension of a vehicle, comprising:
   (A) determining at least one of wheel normals and a center of rotation of at least one wheel of the vehicle;
   (B) moving the vehicle and determining points of a movement trajectory of at least one of the wheel normals and the center of rotation of at least one wheel, during the movement of the vehicle;
   (C) determining a deviation of the movement trajectory of at least one of the wheel normals and the center of rotation acquired in step (B) from a predefined movement trajectory; and
   (D) outputting a defect message, when the deviation exceeds a predefined limiting value.

2. The method as recited in claim 1, wherein the vehicle is a motor vehicle.

3. The method as recited in claim 1, wherein the method includes, in step (B), pushing the vehicle by muscle power or mechanically.

4. The method as recited in claim 1, wherein the method includes, in step (B), moving the vehicle by the power of an engine of the vehicle.

5. The method as recited in claim 1, wherein the method includes mounting at least one measuring target to at least one wheel of the vehicle and optically monitoring the measuring target to determine at least one of the wheel normals and the center of rotation, and the movement trajectory of the at least one of the wheel normals and the center of rotation.

6. The method as recited in claim 1, wherein the method includes constructing a circle, which is, on average, a shortest possible distance from determined points of the movement trajectory.

7. The method as recited in claim 6, wherein the method includes determining at least one of: i) a sum of distances of the points of the movement trajectory from at least one of the circle, and ii) a number of points of the movement trajectory which are more than a predefined distance from the circle, and outputting a defect message, if at least one of the sum and the number of points exceeds a predefined limiting value.

8. The method as recited in claim 7, wherein the method includes:
   determining a fitting curve, which runs through all points of the movement trajectory;
   ascertaining the curvature of the fitting curve and comparing it to the curvature of the circle; and
   outputting a defect message when the difference between the curvature of the fitting curve and the curvature of the circle exceeds the predefined limiting value.

9. The method as recited in claim 1, wherein the method includes inferring a type of defect of the wheel suspension from at least one of: a type and a degree of the deviation of the movement trajectory of at least one of the wheel normals and the center of rotation determined in step (B) from a predefined movement trajectory.

10. A device for checking the wheel suspension of a vehicle, comprising:
    (a) a device which is configured to determine at least one of wheel normals and a center of rotation of a wheel of the vehicle;
    (b) a device which is configured to determine a movement trajectory of the at least one of the wheel normals and the center of rotation of the wheel, during a movement of the vehicle; and
    (c) a comparison and evaluation device which is configured to compare the determined movement trajectory of the at least one of the wheel normals and the center of rotation of the wheel to a predefined movement trajectory, and to output a defect message when the deviation of the determined movement trajectory from the predefined movement trajectory exceeds a predefined limiting value.

11. The device as recited in claim 10, wherein the vehicle is a motor vehicle.

12. The device as recited in claim 10, wherein at least one of: i) the device for determining the at least one of the wheel normals and the center of rotation of a wheel of the vehicle, and ii) the device for determining the movement trajectory of the at least one of the wheel normals and the center of rotation of the wheel, are configured to optically detect at least one of the wheel and a measuring target mounted to the wheel.

* * * * *